US012327414B2

United States Patent
Taghavi et al.

(10) Patent No.: US 12,327,414 B2
(45) Date of Patent: Jun. 10, 2025

(54) SYSTEMS AND METHODS FOR ENHANCEMENT OF 3D OBJECT DETECTION USING POINT CLOUD SEMANTIC SEGMENTATION AND ATTENTIVE ANCHOR GENERATION

(71) Applicants: Ehsan Taghavi, Markham (CA); Ryan Razani, Toronto (CA); Bingbing Liu, Markham (CA)

(72) Inventors: Ehsan Taghavi, Markham (CA); Ryan Razani, Toronto (CA); Bingbing Liu, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 449 days.

(21) Appl. No.: 17/827,963

(22) Filed: May 30, 2022

(65) Prior Publication Data

US 2023/0410530 A1 Dec. 21, 2023

(51) Int. Cl.
*G06V 20/00* (2022.01)
*B60W 30/00* (2006.01)
(Continued)

(52) U.S. Cl.
CPC ............. *G06V 20/58* (2022.01); *B60W 30/00* (2013.01); *G01S 17/89* (2013.01); *G06V 10/26* (2022.01);
(Continued)

(58) Field of Classification Search
CPC ...... G06V 10/764; G06V 10/82; G06V 10/25; G06V 20/56; G06V 20/58; G06V 2201/07;
(Continued)

(56) References Cited

U.S. PATENT DOCUMENTS 11,704,806 B2 * 7/2023 Choudhary ............... G06T 7/50
 345/419
2022/0120858 A1 * 4/2022 Cennamo ................ G01S 13/72
(Continued)

OTHER PUBLICATIONS

Mottaghi, Roozbeh, et al. "The role of context for object detection and semantic segmentation in the wild." Proceedings of the IEEE conference on computer vision and pattern recognition. 2014.*
(Continued)

*Primary Examiner* — Li Liu

(57) ABSTRACT

Devices, systems, methods, and media are disclosed for performing an object detection task comprising: obtaining a semantic segmentation map representing a real-world space, the semantic segmentation map including an array of elements that each represent a respective location in the real-world space and are assigned a respective element classification label; clustering groups of the elements based on the assigned respective element classification labels to identify at least a first cluster of elements that have each been assigned the same respective element classification label; generating, based on a location of the first cluster within the semantic segmentation map, at least one anchor that defines a respective probable object location of a first dynamic object; and generating, based on the semantic segmentation map and the at least one anchor, a respective bounding box and object instance classification label for the first dynamic object.

16 Claims, 8 Drawing Sheets

(51) Int. Cl.
  G01S 17/89    (2020.01)
  G06V 10/26    (2022.01)
  G06V 10/762   (2022.01)
  G06V 10/764   (2022.01)
  G06V 20/58    (2022.01)
(52) U.S. Cl.
  CPC .......... *G06V 10/762* (2022.01); *G06V 10/764* (2022.01); *B60W 2420/408* (2024.01)
(58) Field of Classification Search
  CPC . G06V 20/64; G06T 2207/20084; G06T 7/11; G06T 2207/20081; G06T 2210/12
  See application file for complete search history.

(56) References Cited

U.S. PATENT DOCUMENTS

2022/0261593 A1* 8/2022 Yu ........................ G06N 3/088
2023/0281961 A1* 9/2023 Fazlali ................... G06V 10/82
                                                382/103

OTHER PUBLICATIONS

Felzenszwalb, Pedro F., et al. "Object detection with discriminatively trained part-based models." IEEE transactions on pattern analysis and machine intelligence 32.9 (2009): 1627-1645.*

Feng, Di, et al. "Deep multi-modal object detection and semantic segmentation for autonomous driving: Datasets, methods, and challenges." IEEE Transactions on Intelligent Transportation Systems 22.3 (2020): 1341-1360.*

Zuo, C., et al. "Det2Seg: A Two-Stage Approach for Road Object Segmentation from 3D Point Clouds," 2019 IEEE Visual Communications and Image Processing (VCIP), Sydney, Australia, 2019.

NVidia. "Laser Focused: How Multi-View LidarNet Presents Rich Perspective for Self-Driving Cars", Web blog, https://blogs.nvidia.com/blog/2020/03/11/drive-labs-multi-view-lidarnet-self-driving-cars/, Mar. 2020.

Ku, J., et al. "Joint 3D Proposal Generation and Object Detection from View Aggregation," 2018 IEEE/RSJ International Conference on Intelligent Robots and Systems (IROS), 2018.

Erdal Aksoy, Eren, Saimir Baci, and Selcuk Cavdar. "SalsaNet: Fast Road and Vehicle Segmentation in LiDAR Point Clouds for Autonomous Driving." arXiv preprint arXiv:1909.08291 (2019).

Dewan, Ayush, and Wolfram Burgard. "DeepTemporalSeg: Temporally Consistent Semantic Segmentation of 3D LiDAR Scans." arXiv preprint arXiv:1906.06962 (2019).

Zhang, Feihu, et al. "Instance segmentation of lidar point clouds." 2020 International Conference on Robotics and Automation (ICRA). IEEE, 2020 (to appear).

Lang, Alex H., et al. "Pointpillars: Fast encoders for object detection from point clouds." Proceedings of the IEEE Conference on Computer Vision and Pattern Recognition. 2019.

Cortinhal, T., et al. "SalsaNext: Fast Semantic Segmentation of LiDAR Point Clouds for Autonomous Driving." arXiv preprint arXiv:2003.03653 (2020).

Berman, M., et al. "The lovasz-softmax loss: a tractable surrogate for the optimization of the intersection-over-union measure in neural networks." In Proceedings of the IEEE Conference on Computer Vision and Pattern Recognition, 2018.

Ronneberger, Olaf, Philipp Fischer, and Thomas Brox. "U-net: Convolutional networks for biomedical image segmentation." International Conference on Medical image computing and computer-assisted intervention. Springer, Cham, 2015.

* cited by examiner

SYSTEMS AND METHODS FOR ENHANCEMENT OF 3D OBJECT DETECTION USING POINT CLOUD SEMANTIC SEGMENTATION AND ATTENTIVE ANCHOR GENERATION

CROSS-REFERENCE TO RELATED APPLICATIONS

This is the first application filed for the present disclosure.

FIELD

The present application generally relates to three dimensional (3D) object detection, in particular to devices, systems, methods, and media for enhancement of 3d object detection using semantic segmentation and attentive anchor generation to process point cloud data.

BACKGROUND

Perception is an important task performed by various intelligent/autonomous systems in various fields, such as autonomous driving, autonomous manufacturing, inspection, and medical diagnosis. Intelligent systems such as autonomous vehicles may use one or more Light Detection and Ranging (LiDAR) sensors to perceive their environments. A LiDAR (also referred to a "Lidar" or "LIDAR" herein) sensor generates point cloud data representing a three-dimensional (3D) environment scanned by the LIDAR sensor. A LiDAR sensor generates point cloud data representing a three-dimensional (3D) environment scanned by the LIDAR sensor. Some LIDAR sensors, such as spinning scanning LIDAR sensors, include a laser array that emits light in an arc and the LIDAR sensor rotates around a single location to generate a point cloud frame; other LIDAR sensors, such as solid-state LIDAR sensors, include a laser array that emits light from one or more locations and integrate reflected light detected from each location together to form a point cloud frame. Each laser in the laser array is used to generate multiple points per scanning pass, and each point in a point cloud frame corresponds to an object reflecting light emitted by a laser at a point in space in the environment. Each point is typically stored as a set of spatial coordinates (X, Y, Z) as well as other data indicating values such as intensity (i.e. the degree of reflectivity of the object reflecting the laser). In a scanning spinning LIDAR sensor, the Z axis of the point cloud frame is typically defined by the axis of rotation of the LIDAR sensor, roughly orthogonal to an azimuth direction of each laser in most cases (although some LIDAR sensors may angle some of the lasers slightly up or down relative to the plane orthogonal to the axis of rotation).

A single scanning pass of the LIDAR sensor generates a "frame" of point cloud data, consisting of a set of points from which light is reflected from one or more points in space, within a time period representing the time it takes the LIDAR sensor to perform one scanning pass.

LiDAR becomes an effective sensor for perception tasks because of its active sensing nature with high resolution of sensor readings. In terms of task essence, both instance level object detection and semantic segmentation are two key aspects of perception. Instance level object detection refers to detecting instances of objects within point cloud data. Semantic segmentation refers to the process of partitioning an image, or a point cloud (i.e., a frame) obtained from a LiDAR, or alternative visual representation into multiple segments. Each segment is encoded as a label or tag which is representative of the category that the segment belongs to. Thus, semantic segmentation of LiDAR point clouds is an attempt to predict the category or class label or tag for each point of a point cloud. In the context of autonomous driving, however, object detection or semantic segmentation is not totally independent. As a class label or tag for an object of interest can be generated by semantic segmentation, it can act as an intermediate step to enhance object detection.

For context, some known semantic segmentation and object detection techniques include the following.

Det2Seg (reference [1]: Zuo, C., et al. "Det2Seg: A Two-Stage Approach for Road Object Segmentation from 3D Point Clouds," 2019 IEEE Visual Communications and Image Processing (VCIP), Sydney, Australia, 2019.1]) is a two-stage object detection or instance level segmentation approach. In a 1st detect, regions of interests are detected to localize and classify objects at a coarse level. In a 2nd stage, points from detected regions are extracted into pillars and encoded into a new format which then used for a fine-grained, domain-specific instance segmentation prediction. Det2Seg uses only points from detected regions of interest for object detection.

Multi-view Lidarnet (reference [2]: NVidia. "Laser Focused: How Multi-View LidarNet Presents Rich Perspective for Self-Driving Cars", Web blog, https://blogs.nvidia.com/blog/2020/03/11/drive-labs-multi-view-lidarnet-self-driving-cars/, 2020 March) is also a 2-stage approach. In the 1st stage, point cloud semantic segmentation is applied to output a mask with multiple classes corresponding to a spherical front view (SFV) and transformed into a birds eye view (BEV) view. In a $2^{nd}$ stage, a BEV object detector uses the mask from the 1st stage as input to predict 2D object bounding boxes. The multiple 2D bounding box are post processed to generate final 2D bounding boxes and different object instances are computed. Then, with the heights from the raw point cloud, 3D object bounding boxes are generated.

DeepTemporalSeg (reference [3]: Dewan, Ayush, and Wolfram Burgard. "DeepTemporalSeg: Temporally Consistent Semantic Segmentation of 3D LiDAR Scans." arXiv preprint arXiv:1906.06962 (2019)) is an SFV based method that makes temporally consistent semantic segmentations of 3D point clouds. Dense blocks and depth-wise separable convolutions are used in addition to a Bayes filter to recursively estimate the current semantic state of a point in a LiDAR scan. DeepTemporalSeg can suffer information loss due to spherical transformation as is common in SFV approaches.

SalsaNet (reference [4]: Erdal Aksoy, Eren, Saimir Baci, and Selcuk Cavdar. "SalsaNet: Fast Road and Vehicle Segmentation in LiDAR Point Clouds for Autonomous Driving." arXiv preprint arXiv:1909.08291 (2019)) uses a BEV constructed image of a point cloud for LiDAR segmentation, with a encoder/decoder structure. Three classes, i.e. 'Background', 'Road' and 'Vehicle' are considered as objects of interest. The LiDAR point clouds are projected into both BEV and SFV, and then trained and evaluated. The two pipelines generate similar results with BEV having a better results for 'Background' class while SFV having better ones for both 'Road' and 'Vehicle' classes. SalsaNet has a subsequent, upgraded version, SalsaNext (reference [5]: Cortinhal, T., et al. "SalsaNext: Fast Semantic Segmentation of LiDAR Point Clouds for Autonomous Driving." arXiv preprint arXiv:2003.03653 (2020)).

LiDARSeg (reference [6]: Zhang, Feihu, et al. "Instance segmentation of lidar point clouds." 2020 International Conference on Robotics and Automation (ICRA). IEEE, 2020) is another method that processes LiDAR point cloud in BEV, however it uses instance segmentation rather than a semantic segmentation. LiDARSeg processes 3D point clouds in BEV, with a K-nearest neighbors (KNN) encoding. It then uses self-attention and voxel features to learn more features. After that, it feeds the high-dimensional BEV into a revised stacked double-hourglass network, including the loss in the middle and at the end.

Aggregate View Object Detection (AVOD) (reference [7]: Ku, J., et al. "Joint 3D Proposal Generation and Object Detection from View Aggregation," 2018 IEEE/RSJ International Conference on Intelligent Robots and Systems (IROS), 2018) is an example of a solution that uses a 3D anchor grid. An AVOD network uses both LiDAR point clouds and RGB images to generate features that are shared by two subnetworks: a region proposal network (RPN) and a 2nd stage detector network. The architecture used by the proposed RPN performs multimodal feature fusion from both LiDAR and image on high resolution feature maps to generate 3D object proposals for multiple object classes. Subsequently, the 2nd stage detection network performs accurate oriented 3D bounding box regression and category classification based on these proposals.

In known solutions, object detectors which are designed based on the semantic segmentation of a point cloud often ignore features generated by the semantic segmentation deep neural network (DNN). In the regard, prior solutions only use the output channel of the DNN (for example an output mask or multi-level map) to simplify the object detection task. No other information is extracted from the semantic segmentation process for the object detection task.

Accordingly, there is a need for an object detection and semantic segmentation solution that can capture the features that are available at different stages of the semantic segmentation task and use these features efficiently to improve the object detection task.

SUMMARY

The present disclosure describes devices, systems, methods, and media for enhancing object detection by using features extracted from a semantic segmentation task in order to enhance an object detection task.

According to a first aspect, a method of performing an object detection task is disclosed. The method includes obtaining a semantic segmentation map representing a real-world space, the semantic segmentation map including an array of elements that each represent a respective location in the real-world space, the array of elements including elements that are each assigned a respective element classification label selected from a set of possible classification labels that correspond to different classifications of dynamic objects; clustering groups of the elements based on the assigned respective element classification labels to identify at least a first cluster of elements that have each been assigned the same respective element classification label; generating, based on a location of the first cluster within the semantic segmentation map, at least one anchor that defines a respective probable object location of a first dynamic object; and generating, based on the semantic segmentation map and the at least one anchor, a respective bounding box and object instance classification label for the first dynamic object.

In at least some scenarios, the generation of an anchor that is based on information included in a sematic segmentation map provides localization information that can improve the accuracy and efficiency of generating a bounding box and object instance classification.

According to an example of the first aspect, generating the at least one anchor comprises generating a plurality of anchors including the at least one anchor, each of the plurality of anchors defining a different respective probable object location of the first dynamic object, and generating the respective bounding box and object instance classification label for the first dynamic object is based on the plurality of anchors.

According to one or more of the preceding examples, generating the plurality of anchors includes: computing an approximate location for the first dynamic object in the semantic segmentation map based on the locations of the elements of the first cluster; generating a lower resolution map corresponding to the semantic segmentation map, and mapping the approximate location for the first dynamic object to a corresponding coarse element location in the lower resolution map; generating a plurality of candidate anchors each indicating a different respective probable location of the first dynamic object relative to the coarse element location; and mapping at least some of the plurality of candidate anchors to respective element locations of a higher resolution map to provide the plurality of anchors.

According to one or more of the preceding examples, computing the approximate location for the first dynamic object includes determining a mean element location for the first cluster of elements based on the respective locations of the elements of the first cluster within the semantic segmentation map.

According to one or more of the preceding examples, the method includes sampling the plurality of candidate anchors to select only a subset of the plurality of candidate anchors to include in the mapping to the respective element locations of the higher resolution map.

According to one or more of the preceding examples, generating the plurality of candidate anchors includes selecting, for each candidate anchor: an anchor geometry, an anchor orientation, and an anchor offset relative to the coarse element location.

According to one or more of the preceding examples, clustering groups of the elements is performed to identify, in addition to the first cluster of elements, a plurality of further clusters that include elements that have each been assigned the same respective element classification label, and the method includes, for each of the plurality of further clusters: computing an approximate location in the semantic segmentation map for a respective dynamic object corresponding to the further cluster based on the location of the further cluster within the semantic segmentation map; mapping the approximate location for the respective dynamic object to a corresponding coarse element location in the lower resolution map; generating a respective plurality of candidate anchors each indicating a different respective probable location of the respective dynamic object; and mapping at least some of the respective plurality of candidate anchors to respective element locations in the higher resolution map to provide a respective plurality of anchors for the further cluster, each anchor of the respective plurality of anchors defining a respective probable object location of the respective dynamic object in the higher resolution map. The method further includes: generating a respective bounding box and object instance classification label for each of the respective dynamic objects represented in the plurality of further clusters based on the plurality of anchors provided for each of the plurality of further clusters.

According to one or more of the preceding examples, the method includes, prior to generating the respective bounding boxes and object instance classification labels for the first dynamic object and the respective dynamic objects represented in the plurality of further clusters, generating additional anchors according to a defined set of ad-hoc rules, each of the additional anchors defining a respective probable object location in the higher resolution map, wherein the generating the respective bounding boxes and object instance classification labels is also based on the additional anchors.

According to one or more of the preceding examples, obtaining the semantic segmentation map includes obtaining a Light Detection and Ranging (LIDAR) frame of the real-world space using a LIDAR sensor and using a semantic segmentation model to assign the element classification labels used for the elements of the semantic segmentation map.

According to one or more of the preceding examples, the method includes applying a 3D to 2D conversion operation on an output of semantic segmentation model to generate the semantic segmentation map, wherein the semantic segmentation map represents a birds-eye-view (BEV) of the real-world space, and wherein the at least one anchor defines the respective probable object location of the first dynamic object with respect to the semantic segmentation map.

According to one or more of the preceding examples, the semantic segmentation map represents a 3D volume of the real-world space, and wherein the at least one anchor defines the respective probable object location of the first dynamic object with respect to the semantic segmentation map.

According to one or more of the preceding examples, the method includes controlling one or more of a steering and a speed of an autonomous vehicle based on the respective bounding box and object instance classification label for the first dynamic object.

In some aspects, the present disclosure describe a system and a non-transitory computer readable medium for implementing one or more of the aspects described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

Figure 1:
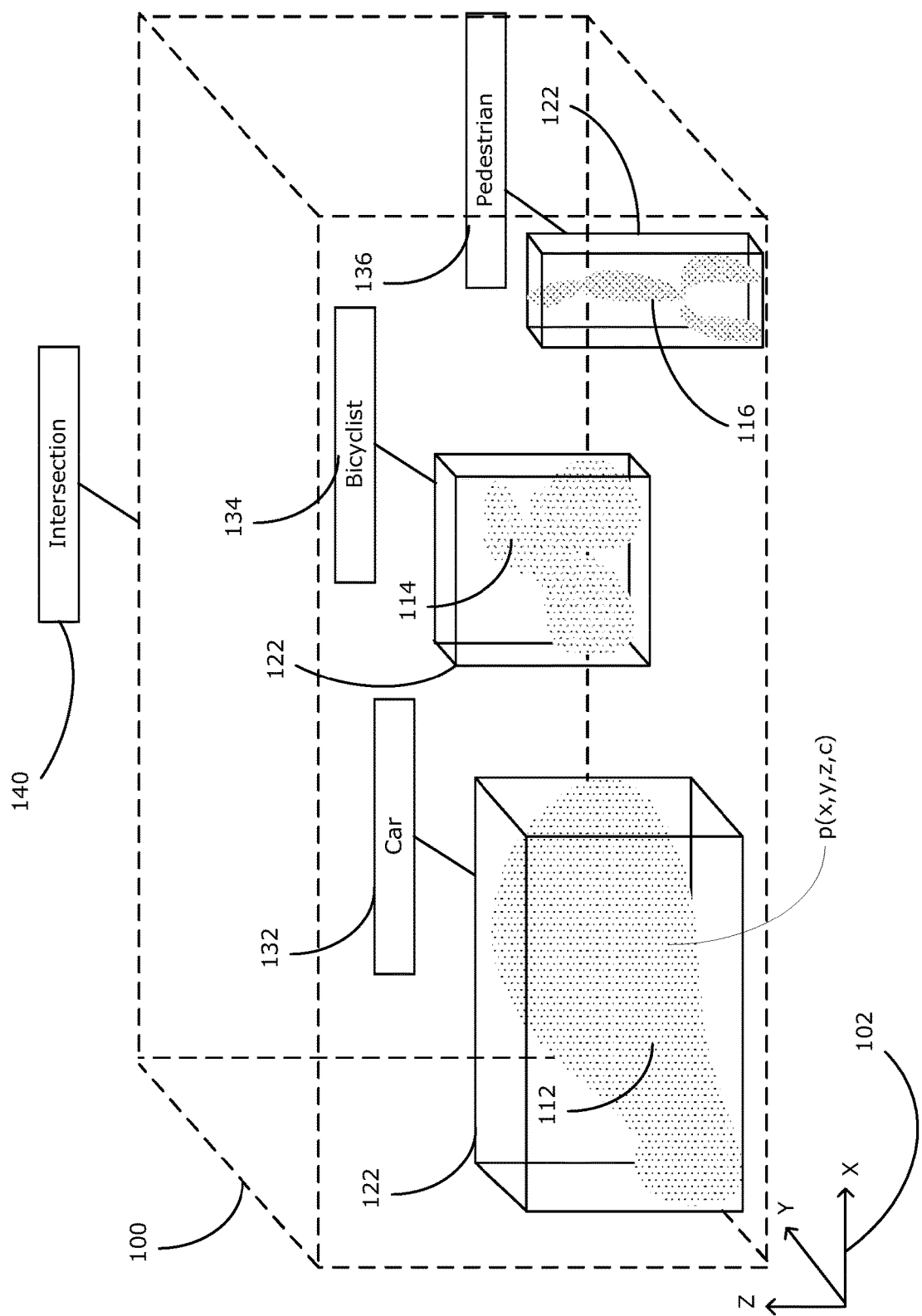
FIG. 1 is an upper front right side perspective view of an example simplified point cloud frame, providing an operating context for embodiments described herein.

The present disclosure describes devices, systems, methods, and media for enhancing object detection by using features extracted from semantic segmentation deep neural networks for point cloud data in order to boost processing by an object detection model.

In this document, unless the specific context specifies otherwise, the following terms can have the following meanings.

As used herein, "point cloud frame" and "point cloud" can each refer to a "frame" of point cloud data, i.e. an ordered set of reflected points measured by a point cloud sensor such as a LIDAR sensor for a scanning pass. Point cloud frames may also be generated by other scanning technologies, such as high-definition radar or depth cameras, and theoretically any technology using scanning beams of energy, such as electromagnetic or sonic energy, could be used to generate point cloud frames. Whereas examples will be described herein with reference to LIDAR sensors, it will be appreciated that other sensor technologies which generate point cloud frames could be used in some embodiments.

As used herein "map" can refer to a data structure that includes an ordered set of map elements that each correspond to a respective location in a space that is represented by the map. Each map element can be populated with a value or a vector of values that indicates a characteristic or property of the location that the map element corresponds to. By way of example, a map can be 2D array of map elements that represent a 2D space (e.g. a plane); a map can be a 3D array of map elements that represent a 3D space (e.g., a volume). A point cloud frame is an example of a 3D map.

As used herein, the term "model" refers to a probabilistic, mathematical, or computational model used to process input data to generate prediction information regarding the input data. In the context of machine learning, a "model" refers to a model trained using machine learning techniques; the term "network" may refer to a model trained using machine learning that is configured as an artificial neural network or other network structure. The term "subnetwork" refers to a portion of network or other model.

As used herein, the terms "module", "process", and "generator" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit.

The following describes example technical solutions of this disclosure with reference to accompanying figures. Similar reference numerals may have been used in different figures to denote similar components.

FIG. 1 shows an example simplified point cloud frame 100, with points (also referred to as point elements) mapped to a three-dimensional coordinate system 102 X, Y, and Z, wherein the Z dimension extends upward, typically as defined by the axis of rotation of the LIDAR sensor or other panoramic sensor generating the point cloud frame 100. The point cloud frame 100, which represents a real-world 3D space, includes a number of point elements p, each of which may be represented by a set of coordinates (x, y, z) within the point cloud frame 100 along with a vector of other values, such as an intensity value indicating the reflectivity of an object corresponding to the point. Each point element represents a reflection of light emitted by a laser at a point in space relative to the LIDAR sensor corresponding to the point coordinates. Whereas the example point cloud frame 100 is shown as a box-shape or rectangular prism, it will be appreciated that a typical point cloud frame captured by a panoramic LIDAR sensor is typically a 360 degree panoramic view of the environment surrounding the LIDAR sensor, extending out to a full detection range of the LIDAR sensor. The example point cloud frame 100 is thus more typical of a small portion of an actual LIDAR-generated point cloud frame, and is used for illustrative purposes.

The point elements of the point cloud frame 100 are clustered in space where light emitted by the lasers of the LIDAR sensor are reflected by objects in the environment, thereby resulting in clusters of point elements corresponding to the surface of an object visible to the LIDAR sensor. The point cloud frame 100 of FIG. 1 illustrates examples of both element-level classification labels and object instance-level classification labels as applied in respect of bounding boxes that are defined for clusters of point elements that belong to an instance of an object.

By way of illustration in point cloud frame 100, a first cluster 112 of point elements corresponds to reflections from a dynamic object that is a car. In the example point cloud frame 100, the first cluster 112 of point elements is enclosed by a bounding box 122 and associated with an object instance-level classification label for the object, in this case the label "car" 132. A second cluster 114 of point elements 114 is enclosed by a bounding box 122 and associated with the object instance classification label "bicyclist" 134, and a third cluster of points 116 is enclosed by a bounding box 122 and associated with the object instance classification label "pedestrian" 136. Each point cluster 112, 114, 116 thus corresponds to an object instance: an instance of object class "car", "bicyclist", and "pedestrian" respectively. The entire point cloud frame 100 is associated with a scene type label 140 "intersection" indicating that the point cloud frame 100 as a whole corresponds to the environment near a road intersection (hence the presence of a car, a pedestrian, and a bicyclist in close proximity to each other).

The object instance classification labels and bounding boxes in FIG. 1 correspond to labels used in the context of object detection. In this regard, the example labelled point cloud frame 100 of FIG. 1 could be included in a training dataset that is used to train a machine learned model for object detection on point cloud frames.

Classification at the point element-level, known as semantic segmentation, can be used to classify individual point elements that are included in a point cloud frame. An example point element $p(x,y,z,c)$, is illustrated in FIG. 1, where x,y,z is a point location in a reference coordinate system of the point cloud frame 100 and c is a point element classification label). For example, a point cloud frame labeled using semantic segmentation might include multiple "car" object instances that each are represented as a respective point cluster 112, but each point element p in each such point cluster would be labeled with the same "car" point element classification label; the individual object instances corresponding to each car in the real-world scene are not be segmented or distinguished from each other by a semantic segmentation labeling process. By the same token, semantic segmentation does not define the point cloud clusters 112, 114, 116 using bounding boxes; rather, each point element p within each such point cloud cluster would simply be associated with a semantic label indicating a classification category (e.g., "car", "bicyclist", "pedestrian"). Semantic segmentation of the point cloud frame 100 can be represented as an X by Y by Z semantic segmentation map, with each point element of the semantic segmentation map representing a respective point element p in the feature map and being assigned a respective point element classification label c. The semantic segmentation map can also be represented as set of classification-specific semantic maps, also referred to as masks. For example, a "car" mask can include an X by Y by Z array of elements in which the "car" labelled point elements of the feature map are assigned values of "1" and all other point elements are assigned values of "0". A "bicyclist" mask can include an X by Y by Z array of point elements in which the "bicyclist" labelled points of the feature map are assigned values of "1" and all other point elements are assigned values of "0". A set of semantic masks generated in respect of a point cloud frame 100 can include a respective mask for each possible point element class.

In some examples, a single point cloud frame may include multiple scenes, each of which may be associated with a different scene type label 140. A single point cloud frame may therefore be segmented into multiple regions, each region being associated with its own scene type label 140. Example embodiments will be generally described herein with reference to a single point cloud frame being associated with only a single scene type; however, it will be appreciated that some embodiments may consider each region in a point cloud frame separately for point cloud object instance injection using the data augmentation methods and systems described herein.

Figure 2:
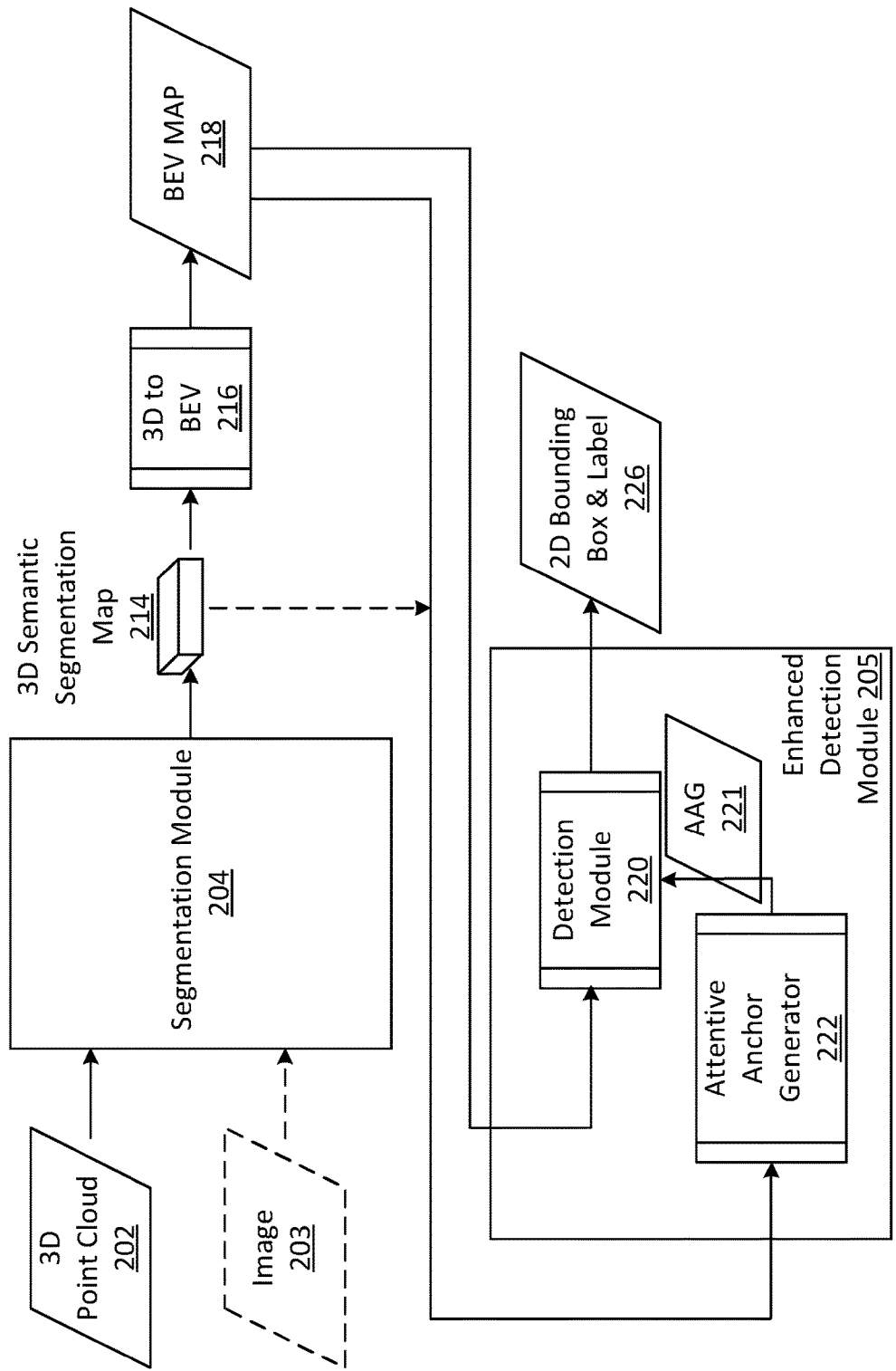
FIG. 2 is a block diagram of an example of a semantic segmentation and object detection system, in accordance with examples described herein.

FIG. 2 illustrates a block diagram of a semantic segmentation and object detection system 200 ("system" 200), according to example embodiments. The system 200 includes segmentation module 204, 3D semantic representation to birds-eye view (BEV) mapping process 216, and an enhanced detection module 205. The enhanced detection module 205 includes a detection module 220 and an attentive anchor generator 222. With the exception of attentive anchor generator 222, the components of object detection system 200 can be implemented using available sematic segmentation and object detection architecture solutions, subject to modifications that will be apparent from the following description. By way of non-limiting example, the segmentation module 204 and detection module 220 can each be implemented using respective machine learning based DNN models that use DNN architectures such as described in reference documents cited in the Background of the present disclosure. By way of non-limiting example, the segmentation module 204 can be based on model architecture such as that disclosed in above noted reference [4] Erdal Aksoy, Eren, Saimir Baci, and Selcuk Cavdar. "SalsaNet: Fast Road and Vehicle Segmentation in LiDAR Point Clouds for Autonomous Driving." arXiv preprint arXiv: 1909.08291 (2019); the detection module 220 can be based on model architecture such as that disclosed in above noted reference [7]: Ku, J., et al. "Joint 3D Proposal Generation and Object Detection from View Aggregation," 2018 IEEE/RSJ International Conference on Intelligent Robots and Systems (IROS), 2018.

As will be explained in greater detail below, attentive anchor generator 222 is configured to leverage features generated by the segmentation module 204 to propose anchors that define regions of interests RoIs for the detection module 220 to use when performing object detection in respect of dynamic objects. The term "anchor", as used in this disclosure, can refer to a set of data that defines a location of a geometric area or space with reference to a reference coordinate system of a 2D or 3D map, respectively. In at least some scenarios, the inclusion of attentive anchor generator 222 can enable enhanced detection module 205 to function with a much lower computational complexity than prior fixed-anchor-based object detection solutions.

The segmentation module 204 is configured to receive a 3D point cloud frame 202 as input and output a respective 3D semantic segmentation map 214 corresponding to the point cloud frame 202. The 3D semantic segmentation map 214 can be a three-dimensional array of point elements that can each be assigned respective per-point semantic information. For example, 3D semantic segmentation map 214 can include a feature map that includes an X,Y,Z array of point elements that correspond to the point elements included in 3D point cloud frame 202. Segmentation module 204 applies a semantic segmentation model to assign respective point element classification labels to the point elements (for example "car", "truck", "pedestrian"). Each respective point element classification label is selected from a pre-defined set of candidate point element classification labels. The pre-defined set of candidate point element classification labels can include labels for different classes of dynamic objects that are represented in the LiDAR data of the point cloud frame. In some examples, 3D semantic segmentation map 214 can be a 3D map structure that can include point elements for all possible object classifications. In some examples, 3D semantic segmentation map 214 can be generated as a set of class-specific semantic segmentation maps (also referred to a masks) that includes a specific semantic segmentation mask for each object class. In some examples, segmentation module 204 may also receive camera image data 203 as input for use in generating 3D semantic segmentation map 214.

BEV mapping process 216 is configured to receive 3D semantic segmentation map 214 as input and map the 3D point elements (and their respective class labels) to a 2D (x,y) plane to output a respective 2D BEV map 218 (for example a BEV map). By way of example, 2D BEV map 218 may include a 512 by 512 array of BEV elements that each represent a respective spatial BEV location. A BEV element will be assigned a BEV element classification label that corresponds to the classification labels of the point elements that map to it. In some examples, 2D BEV map 218 may take the form of a set of (x,y) plane masks that includes a respective 512 by 512 mask array for each type of classification label.

In example embodiments, attentive anchor generator 222 is configured to generate an attentive anchor grid (AAG) list 221 based on the semantic segmentation data generated by the segmentation module 214. AAG list 221 defines a set of anchors, each of which respectively define a probable location of a dynamic object. This region of interest (ROI) data can be used by an object detection module 220 to enable a more efficient dynamic object instance bounding box definition and classification labelling process. Unlike known anchor grid based solutions that are based on a fixed anchor grid, attentive anchor generator 222 generates a unique attentive anchor grid list 221 for each point cloud frame 202 that is based on the specific semantic segmentation data generated for the point cloud frame 202 by the segmentation module 204.

In some examples embodiments, the attentive anchor generator 222 is configured to process the semantic segmentation data as represented in 2D BEV map 218. In alternative examples embodiments, the attentive anchor generator 222 is configured to process the semantic segmentation data as represented in 3D semantic segmentation map 214. Both a 2D version and a 3D version of attentive anchor generator 222 are described below.

Figure 3:
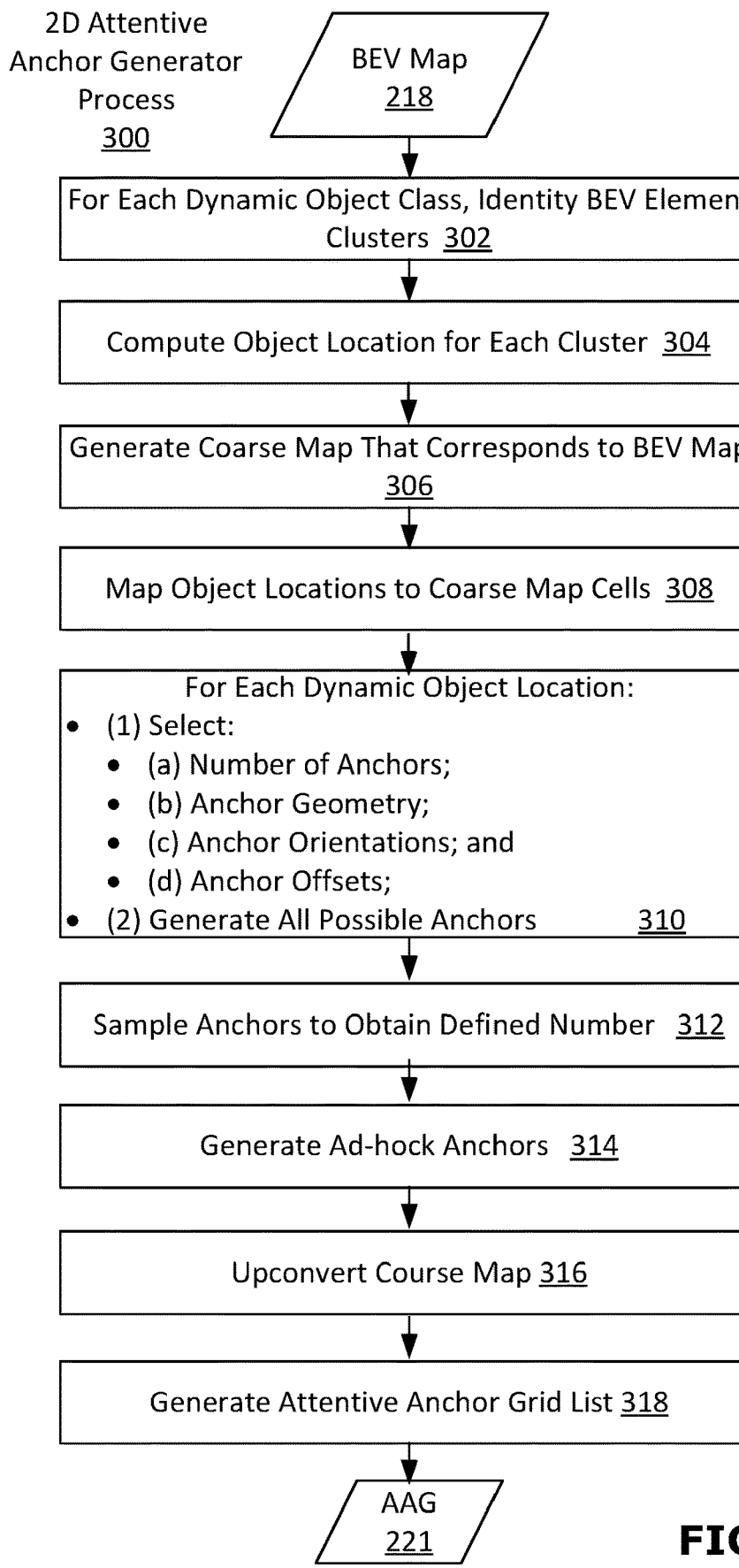
FIG. 3 is a flow diagram of a process performed by a 2 dimensional attentive anchor generator of the system of FIG. 2, according to example embodiments.

FIG. 3 illustrates an example of process 300 performed by a 2D version of attentive anchor generator 222 based on BEV map 218. 2D BEV map 218 includes an X by Y grid (for example 512 by 512) of BEV elements that each represent a respective real-world area. As indicated at block 302, a clustering algorithm is performed on the BEV map 218 in order to identify discrete clusters of BEV elements in the (x,y) plane that have been assigned the same dynamic object classification labels. By way of example, a clustering method such as fast Density Based Spatial Clustering of Applications with Noise (fast DBSCAN) can be used to identify discrete clusters of BEV elements that share a common classification label. Each discrete cluster of BEV elements of the same dynamic object class is assumed to correspond to a discrete dynamic object of that object class located within the spatial area that is defined by BEV map 218.

Figure 4:
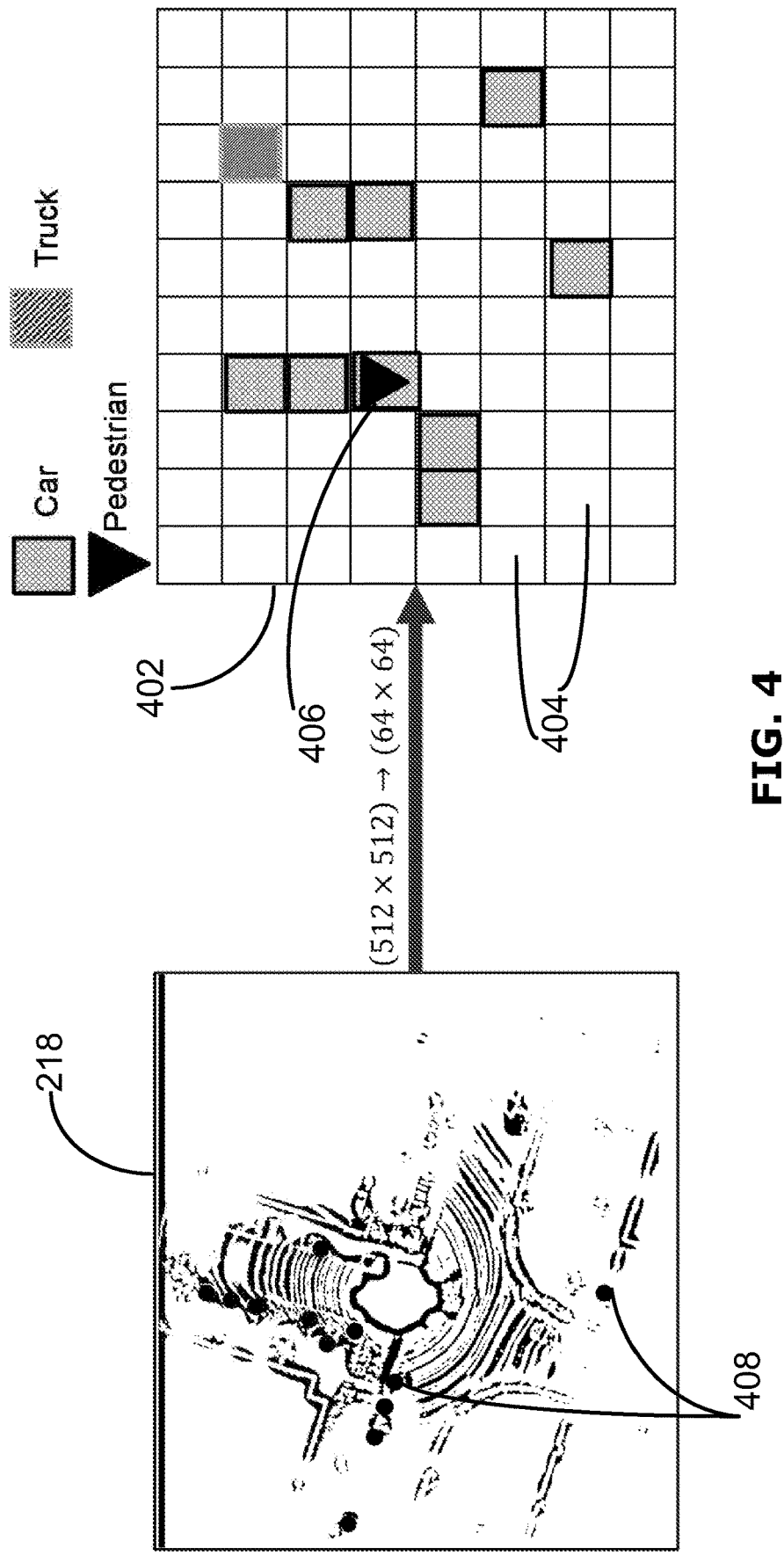
FIG. 4 is a schematic representation of a birds eye view (BEV) representation that includes semantic segmentation information and a corresponding coarse grid, in accordance with examples described herein.

As indicated in block 304, for each discrete cluster, an approximate object location is computed. In example embodiments, a mean object location is used as the approximate object location and is determined by computing the mean location in the (x,y) plane of all of the BEV elements included in the cluster. By way of example, the left side of FIG. 4 shows an illustrative example of a BEV map 218. Each point 408 is an illustrative example of the mean object location of a respective BEV element cluster that corresponds to the dynamic object class "automobile". The mean (x,y) plane BEV object location (as represented by a point 408) provides the approximate object location of a respective dynamic object within the spatial area that is included within BEV map 218.

As indicted at block 306, and graphically illustrated in FIG. 4, a lower resolution (i.e. "coarse") BEV map 402 is generated that corresponds to the BEV map 218. In particular, the resolution of BEV map 218 is down-converted such that groups of BEV elements from the X by Y BEV map 218 are mapped to respective coarse elements (i.e., cells 404) in an X1 by Y1 coarse BEV map 402, where X1=X/S and Y1=Y/S and S is a down conversion scaling factor. By way of illustration, in one non-limiting example, X=Y=512, S=8 and X1=Y1=64, such that unique groups of 64 BEV elements from the BEV map 218 are each mapped to a respective cell 404 of coarse BEV map 402. As indicated at block 308, the mean object locations computed for BEV map 218 are mapped to respective cells within the coarse BEV map 402, resulting in a coarse BEV map 402 that identifies approximate locations of the dynamic objects included in the input 3D point cloud 202. Given the resolution down-conversion that occurs from BEV map 218 to the coarse BEV map 402, multiple dynamic object locations can be mapped to the same cell 404 location. This is illustrated in the representative coarse BEV map 402 of FIG. 4 in which the object location for both a car and a pedestrian from BEV map 218 are mapped to and occupy the same cell 406.

As indicated in block 310 of FIG. 3, a group of candidate anchors are then generated for each of the dynamic object locations that are included in the coarse BEV map 402. In an example embodiment, the following set of attributes are selected for each dynamic object location: (a) Number of Anchors that are included in the group of candidate anchors for the dynamic object location; (b) Anchor Geometry (i.e., Size/Shape) for each of the candidate anchors (e.g., a geometric anchor size and shape such as "rectangle having a defined length and width that in the (x,y) plane"; (c) Anchor Orientation for each of the candidate anchors (e.g., an angular value indicating a degree of rotation of the anchor relative to a reference axis in the (x,y) plane); and (d) Anchor Offset for each of the candidate anchors (e.g., an offset of a center of the anchor in the (x,y) plane relative to the dynamic object location that the anchor is associated with). In some examples, one or more of these attributes are selected based on the classification label assigned to the dynamic object location. In some examples, the same attributes may be used for each dynamic object location of the same class. In some examples, the attributes may be selected for each dynamic object location from a class-specific pre-defined range of attribute options.

Figure 5B:
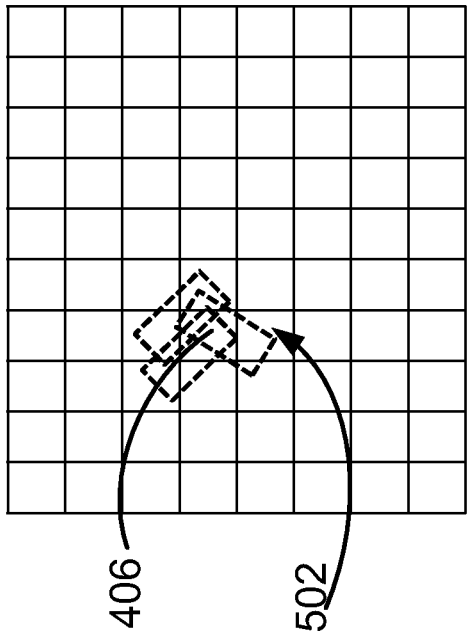
FIGS. 5A, 5B and 5C are a schematic representation of attentive anchor grid generation by the attentive anchor generator process of FIG. 3 corresponding to the coarse grid of FIG. 4.
Figure 5C:
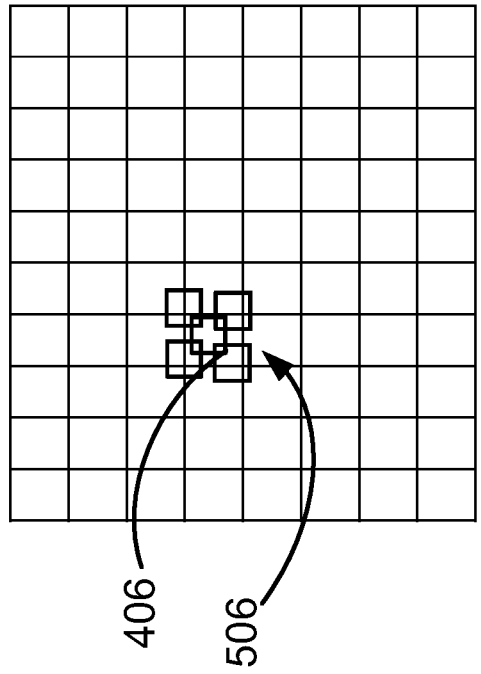
Figure 5A:
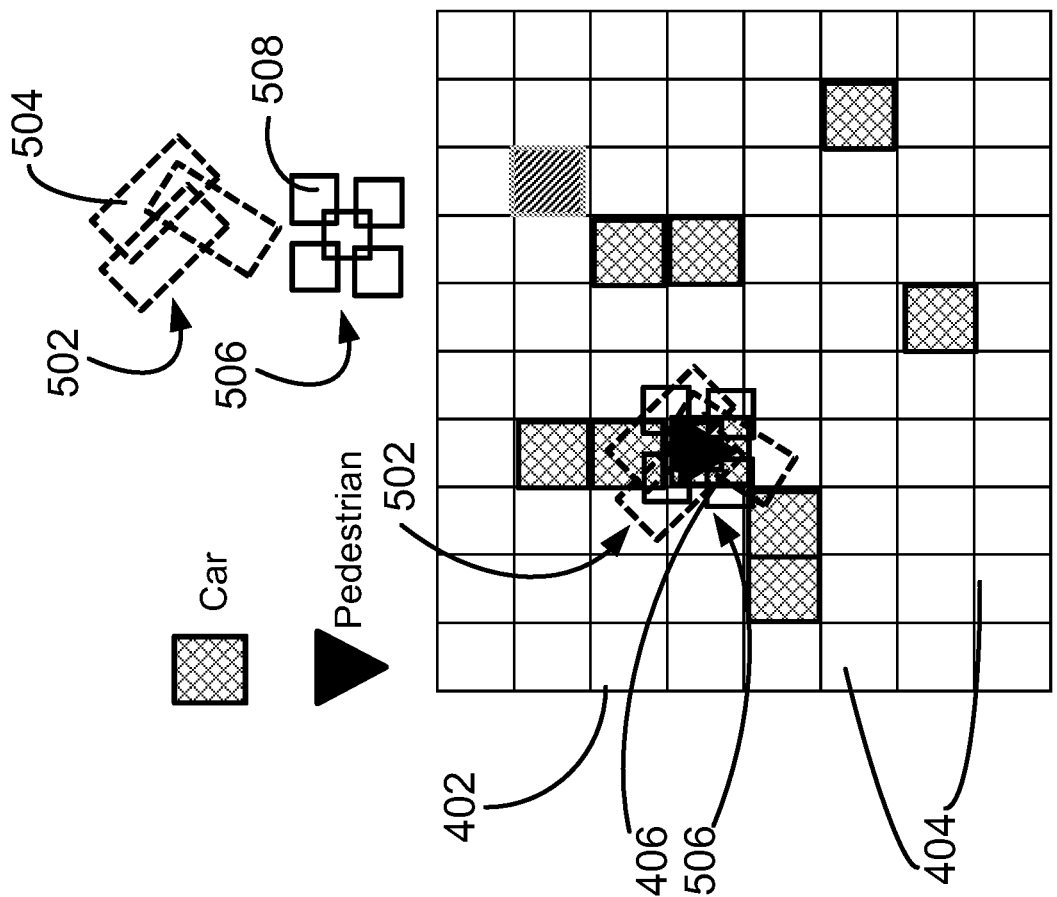

For example, in FIG. 5A, a "car" class dynamic object location corresponding to cell 406 is assigned an anchor group 502 of 3 anchors 504. Each "car" anchor 504 has an identical defined size and shape, and each "car" anchor 504 has a respective off-set and orientation relative to a central point of the dynamic object location that it is generated in respect of. The "pedestrian" class dynamic object location corresponding to cell 406 is assigned an anchor group 506 of 3 anchors 508. Each "pedestrian" anchor 508 has an identical defined size and shape, and each "pedestrian" anchor 508 has a respective off-set and orientation relative to a central point of the dynamic object location that it is generated in respect of. By way of example, FIG. 5B graphically illustrates the anchor group 502 generated for the "car" dynamic object location at cell 406, FIG. 5C graphically illustrates the anchor group 506 generated for the "pedestrian" dynamic object location at cell 406, and FIG. 5A shows the anchor groups 502 and 506 both overlaid on cell 406 of the coarse BEV map 402.

Accordingly, for each occupied cell in coarse BEV map 402, anchor attributes are selected and a respective group of anchors are generated for each dynamic object location that is associated with the cell. For each group of candidate anchors, the following attributes are selected: (a) Number of Anchors; (b) Anchor Geometry; (c) Anchor Orientations; and (d) Anchor Offsets. In some examples, the selected attributes may be the same for all object locations for a dynamic object class. In some examples, the selected attributes may be randomly selected (within defined ranges) for each dynamic object location.

As indicated at block 312, in some examples, the candidate anchors generated in block 310 can be sampled to obtain a defined number of anchors. For example, a random sampling method or a systematic sampling method can be applied to select a subset of a desired number of the candidate anchors included in the sets of anchors and discard the remaining anchors.

As indicated at block 314, in some examples, further object class specific anchors can be generated in an ad-hoc manner and added to the candidate anchors remaining after block 312. In some examples, these additional anchors can be randomly generated for random cells 404 of coarse BEV map 402. For example, up to a defined number of "car" anchors that have same anchor attributes selected for "car" anchors in block 310 for can be randomly generated for random cell locations and added to the candidate anchors. Anchors for other dynamic object classes can similarly be randomly added. In some examples, the ad-hock generation of additional anchors may be based on prior information. For example, anchors can be randomly generated with a higher frequency for coarse BEV map regions that are known, based on historic data, to have a higher probability of being occupied by a specific type of dynamic object class.

The output of block 314 is a set of anchors for the coarse BEV map 402. As indicated at block 316, the course BEV map 402, populated with dynamic object class specific anchors 504, 508, is then upconverted back to a higher resolution BEV map in order to map the locations of all of the generated anchors 504, 508 to corresponding locations in the (x,y) plane coordinates of the higher resolution BEV map. The higher resolution BEV map can for example have the same grid size resolution as source BEV map 218. As indicated in block 318, the generated anchors and their respective coordinates relative to the (x,y) plane coordinates of the BEV map 218 are assembled into an attentive anchor grid (AAG) list 221.

Figure 6:
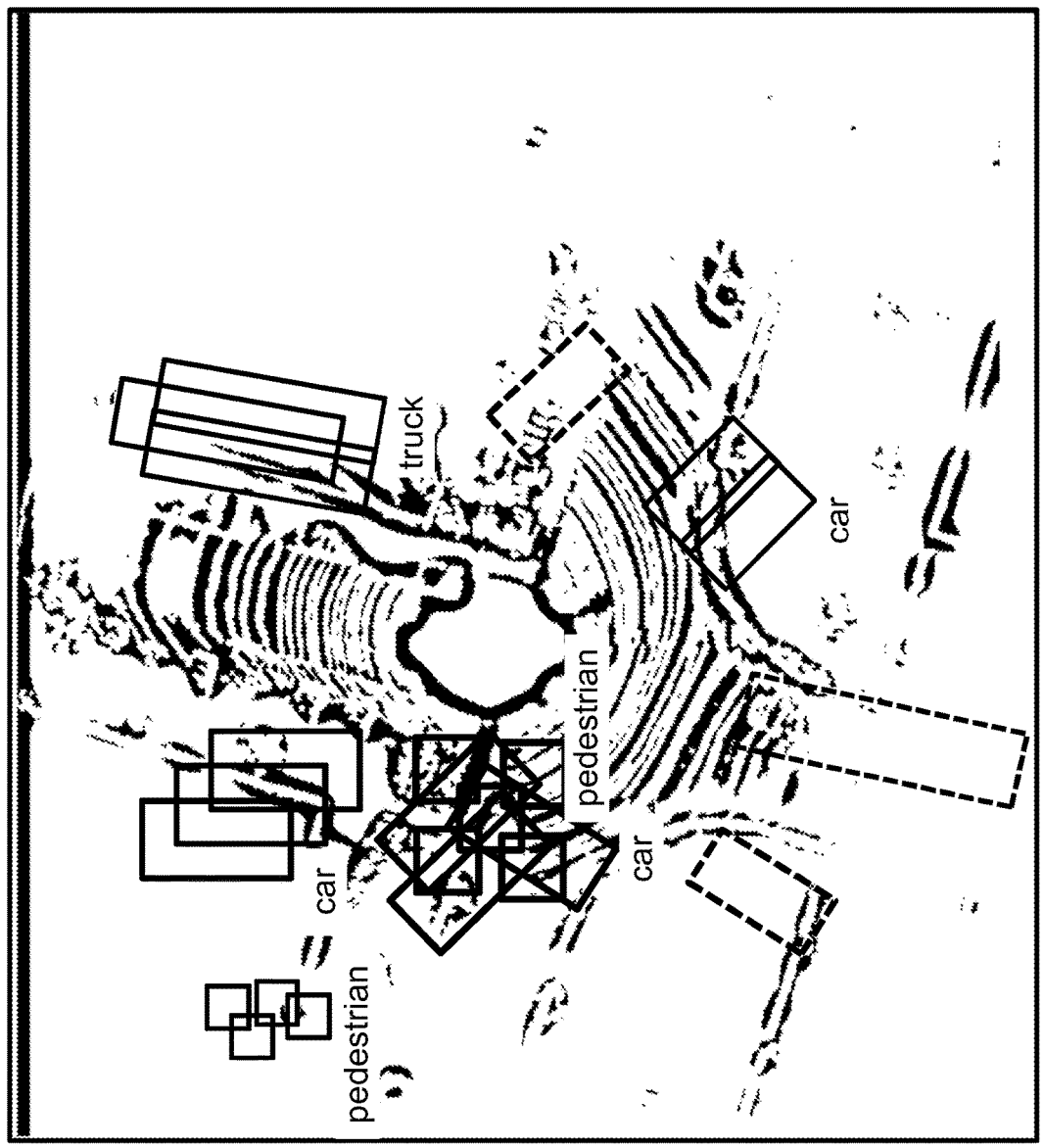
FIG. 6 is a graphic representation of a BEV representation overlaid with attentive anchors generated by the attentive anchor generator process of FIG. 3.

A graphic representation of BEV map 218 overlaid with the anchors specified in AAG list 221 is illustrated in FIG. 6. Anchors generated based on the semantic segmentation information included in BEV map 218 are shown in solid lines, and ad-hoc generated anchors are shown in dashed lines. With reference to FIG. 2, the AAG list 221 is provided to the detection module 220 as a set of additional feature attributes together with the BEV map 218. Based on such inputs, detection module 220 is configured to predict an output that specifies a 2D bounding box and a corresponding dynamic object classification label (shown as 226) for each instance of a dynamic objects that is represented in the input BEV map 218.

It will thus be appreciated that the AAG list 221 indicates probable locations of dynamic objects in the BEV map 218 based on prior knowledge that is included in the semantic segmentation data embedded in BEV map 218. This can be contrasted with known anchor grid solutions based in which the anchors are fixed and thus generated without any reference to the features that are included in the output of the semantic segmentation module. The use of a semantic segmentation data attentive anchor grid rather than a semantic segmentation data agnostic anchor grid can, in some scenarios improve one or both of the accuracy and efficiency of object detection tasks performed by a detection module.

In at least some example embodiments the object detection data (e.g., bounding boxes and respective classification labels) that are output by detection module 220 are provided as real-time inputs to a control system of an autonomous vehicle. The control system of the autonomous vehicle is configured to provide real time control signals to components of the vehicle (for example throttle, brake, and steering components) based on information represented in the object detection data.

Figure 7:
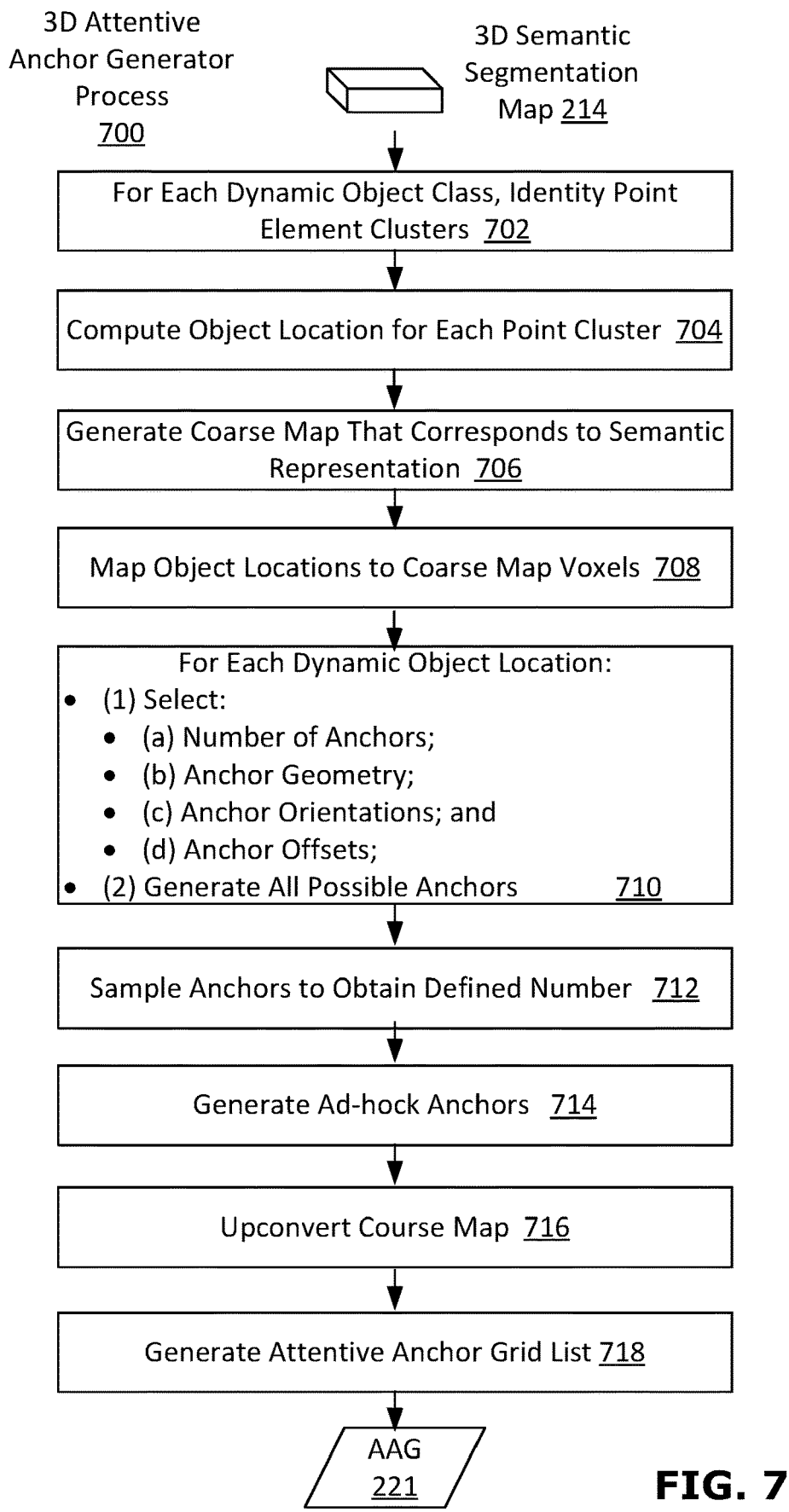
FIG. 7 is a flow diagram of a process performed by a 3 dimensional attentive anchor generator of the system of FIG. 2, according to example embodiments.

As noted above, in some alternative examples attentive anchor generator 222 may be configured to generate a 3D attentive anchor grid based on the 3D semantic segmentation map 214. In this regard, FIG. 7 illustrates an example of process 700 performed by a 3D version of attentive anchor generator 222 based on 3D semantic segmentation map 214. Process 700 is similar to process 300 except that it operates in a 3D (x,y,z) space instead of a 2D (x,y) plane.

In particular, 3D semantic segmentation map 214 includes an X by Y by Z array (for example 512 by 512 by 512) of point elements that each represent a respective real-world location. As indicated at block 702, a clustering algorithm is performed on the semantic segmentation map 214 in order to identify discrete groups of point elements in the (x, y, z) space that have been assigned the same dynamic object classification. As noted above, a clustering method such as fast DBSCAN can be used to identify discrete clusters of point elements of the same object classification. As indicated in block 704, for each discrete point element cluster, an approximate object location is generated by computing the mean location in the (x,y,z) space of all of the point elements included in the cluster.

As indicted at block 706, a lower resolution (i.e. "coarse") 3D map of course 3D elements (e.g., volume elements or "voxels") is generated that corresponds to the semantic segmentation map 214. In particular, groups of neighboring point elements from the X by Y by Z semantic segmentation map 214 are mapped to respective voxels in an X1 by Y1 by Z1 coarse voxel map, where X1=X/S, Y1=Y/S, and X1=X/S and S is a resolution downscaling factor. By way of illustration, in one non-limiting example, X=Y=Z=512, S=8 and X1=Y1=Z1=64, such that unique groups of 512 point elements from the semantic segmentation map 214 are each mapped to a respective voxel of the corresponding coarse voxel map. As indicated at block 708, the mean object locations computed for semantic segmentation map 214 are mapped to respective voxels within the coarse voxel map. Multiple dynamic object locations can be mapped to the same voxel.

As indicated in block 710 of FIG. 7, a group of candidate anchors are then generated for each of the dynamic object locations that are included in the coarse voxel map. The attributes can be the same as those described above in respect of 2D process 300, except will include information for 3 dimensions.

As indicated at block 712, in some examples, the candidate anchors generated in block 710 can be sampled to obtain a defined number of anchors. For example, a random sampling method or a systematic sampling method can be applied to select a subset of a desired number of the candidate anchors included in the sets of anchors and discard the remaining anchors.

As indicated at block 714, in some examples, further object class specific anchors can be generated in an ad-hoc manner and added to the candidate anchors remaining after block 712. In some examples, these additional anchors can be randomly generated for random voxels of the coarse voxel map.

The output of block 714 is a list of anchors for the coarse voxel map. As indicated at block 716, the course voxel map, populated with dynamic object class specific anchors, is then scaled back to the original size of the source semantic segmentation map 214 in order to map the locations of all of the generated anchors to corresponding locations in the (x,y,z) coordinates of the source semantic segmentation map 214. As indicated at block 718, the generated anchors and their respective coordinates relative to the (x, y, z) coordinates of the semantic segmentation map 214 are assembled into an AAG list 221.

With reference to FIG. 2, the AAG list 221 is provided to the detection module 220 as a set of additional feature attributes together with the BEV map 218. Based on such inputs, detection module 220 is configured to predict an output that specifies a bounding box and a corresponding dynamic object classification label for each instance of a dynamic objects that is represented in the input Semantic segmentation map 214.

Figure 8:
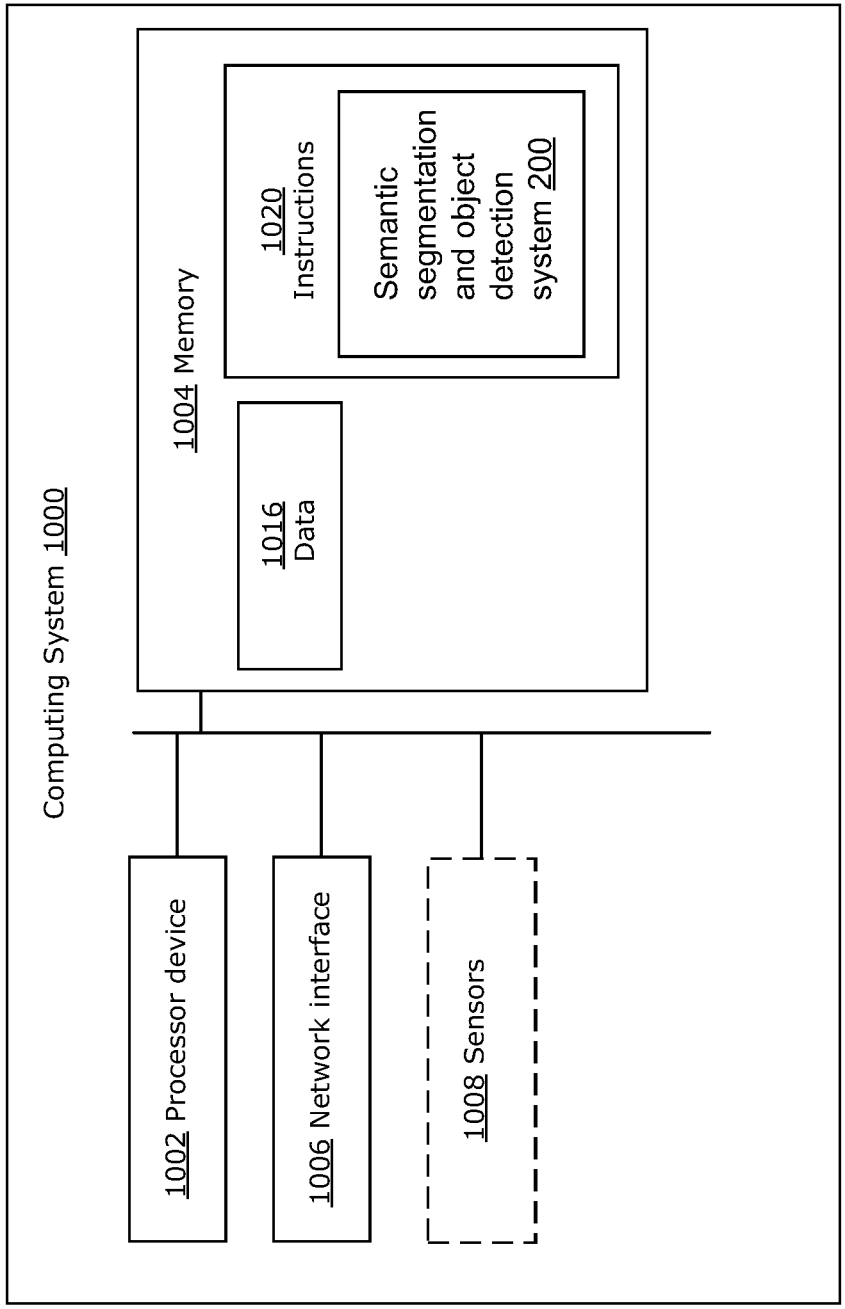
FIG. 8 is a block diagram of an example computing system suitable for implementation of examples described herein.

FIG. 8 is a block diagram of a computing system 1000 (hereinafter referred to as system 1000) for training or implementing a semantic segmentation and object detection system 200. Although an example embodiment of the system 1000 is shown and discussed below, other embodiments may be used to implement examples disclosed herein, which may include components different from those shown. Although a single instance of each component of the system 1000 is illustrated, there may be multiple instances of each component.

The system 1000 includes one or more processors 1002, such as a central processing unit, a microprocessor, an application-specific integrated circuit (ASIC), a field-programmable gate array (FPGA), a dedicated logic circuitry, a tensor processing unit, a neural processing unit, a tensor processing unit, dedicated artificial intelligence processing unit, an accelerator, or combinations thereof. The one or more processors 1002 may collectively be referred to as a "processor device" or "processor 1002".

The system 1000 includes one or more memories 1004 (collectively referred to as "memory 1004"), which may include a volatile or non-volatile/non-transitory memory (e.g., a flash memory, a random access memory (RAM), and/or a read-only memory (ROM)). The non-transitory memory 1004 may store machine-executable instructions for execution by the processor 1002, such as to carry out examples described in the present disclosure. A set of machine-executable instructions 1020 for implementing semantic segmentation and object detection system 200 are shown stored in the memory 1004, which may each be executed by the processor 1002 to perform the steps of the methods described herein. The memory 1004 may include other machine-executable instructions, such as for implementing an operating system and other applications or functions.

The memory 1004 can store one or more supporting datasets 1006. The memory 1004 may also store other data, information, rules, policies, and machine-executable instructions described herein.

The system 1000 includes at least one network interface 1006 for wired or wireless communication with other systems. For example, the system 1000 may receive sensor data (e.g., LiDAR sensor data) via the network interface 1006. Optionally, the system 1000 may include one or more sensors 1008 (e.g., the system 1000 may include a LiDAR sensor).

In some examples, the system 1000 may also include one or more electronic storage units (not shown), such as a solid state drive, a hard disk drive, a magnetic disk drive and/or an optical disk drive. In some examples, one or more datasets and/or modules may be provided by an external memory (e.g., an external drive in wired or wireless communication with the system 1000) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The storage units and/or external memory may be used in conjunction with memory 204 to implement data storage, retrieval, and caching functions of the system 200.

The components of the system 1000 may communicate with each other via a bus, for example. In some embodiments, the system 1000 is a distributed computing system such as a cloud computing system and may include multiple computing devices in communication with each other over a network, as well as optionally one or more additional components. The various operations described herein may be performed by different devices of a distributed system in some embodiments.

General

As used herein, statements that a second item (e.g., a signal, value, scalar, vector, matrix, calculation, or bit sequence) is "based on" a first item can mean that characteristics of the second item are affected or determined at least in part by characteristics of the first item. The first item can be considered an input to an operation or calculation, or a series of operations or calculations that produces the second item as an output that is not independent from the first item.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The features and aspects presented in this disclosure may be embodied in many different forms and should not be construed as limited to the embodiments set forth herein. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure. Where possible, any terms expressed in the singular form herein are meant to also include the plural form and vice versa, unless explicitly stated otherwise. In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The contents of all published documents identified in this disclosure are incorporated herein by reference.

The invention claimed is:

1. A method of performing an object detection task comprising:
   obtaining a semantic segmentation map representing a real-world space, the semantic segmentation map including an array of elements that each represent a respective location in the real-world space, the array of elements including elements that are each assigned a respective element classification label selected from a set of possible classification labels that correspond to different classifications of dynamic objects;
   clustering groups of the elements based on the assigned respective element classification labels to identify at least a first cluster of elements that have each been assigned the same respective element classification label;
   generating, based on a location of the first cluster within the semantic segmentation map, a plurality of anchors, each of the plurality of anchors defining a different respective probable object location of a first dynamic object, wherein generating the plurality of anchors comprises:
      computing an approximate location for the first dynamic object in the semantic segmentation map based on the locations of the elements of the first cluster;
      generating a lower resolution map corresponding to the semantic segmentation map, and mapping the approximate location for the first dynamic object to a corresponding coarse element location in the lower resolution map:
      generating a plurality of candidate anchors each indicating a different respective probable location of the first dynamic object relative to the coarse element location; and
      mapping at least some of the plurality of candidate anchors to respective element locations of a higher resolution map to provide the plurality of anchors; and
   generating, based on the semantic segmentation map and the at least one plurality of anchors, a respective bounding box and object instance classification label for the first dynamic object.

2. The method of claim 1 wherein computing the approximate location for the first dynamic object comprises determining a mean element location for the first cluster of elements based on the respective locations of the elements of the first cluster within the semantic segmentation map.

3. The method of claim 1 comprising sampling the plurality of candidate anchors to select only a subset of the plurality of candidate anchors to include in the mapping to the respective element locations of the higher resolution map.

4. The method of claim 1 wherein generating the plurality of candidate anchors comprises selecting, for each candidate anchor: an anchor geometry, an anchor orientation, and an anchor offset relative to the coarse element location.

5. The method of claim 1, wherein clustering groups of the elements is performed to identify, in addition to the first cluster of elements, a plurality of further clusters that include elements that have each been assigned the same respective element classification label,
   the method comprising, for each of the plurality of further clusters:
      computing an approximate location in the semantic segmentation map for a respective dynamic object corresponding to the further cluster based on the location of the further cluster within the semantic segmentation map;

mapping the approximate location for the respective dynamic object to a corresponding coarse element location in the lower resolution map;

generating a respective plurality of candidate anchors each indicating a different respective probable location of the respective dynamic object; and mapping at least some of the respective plurality of candidate anchors to respective element locations in the higher resolution map to provide a respective plurality of anchors for the further cluster, each anchor of the respective plurality of anchors defining a respective probable object location of the respective dynamic object in the higher resolution map, the method further comprising:

generating a respective bounding box and object instance classification label for each of the respective dynamic objects represented in the plurality of further clusters based on the plurality of anchors provided for each of the plurality of further clusters.

6. The method of claim 5 comprising, prior to generating the respective bounding boxes and object instance classification labels for the first dynamic object and the respective dynamic objects represented in the plurality of further clusters, generating additional anchors according to a defined set of ad-hoc rules, each of the additional anchors defining a respective probable object location in the higher resolution map, wherein the generating the respective bounding boxes and object instance classification labels is also based on the additional anchors.

7. The method of claim 1 wherein obtaining the semantic segmentation map comprises obtaining a Light Detection and Ranging (LIDAR) frame of the real-world space using a LIDAR sensor and using a semantic segmentation model to assign the element classification labels used for the elements of the semantic segmentation map.

8. The method of claim 7 comprising applying a 3D to 2D conversion operation on an output of semantic segmentation model to generate the semantic segmentation map, wherein the semantic segmentation map represents a birds-eye-view (BEV) of the real-world space, and wherein the at least one anchor defines the respective probable object location of the first dynamic object with respect to the semantic segmentation map.

9. The method of claim 7 wherein the semantic segmentation map represents a 3D volume of the real-world space, and wherein the at least one anchor defines the respective probable object location of the first dynamic object with respect to the semantic segmentation map.

10. The method of claim 1 comprising controlling one or more of a steering and a speed of an autonomous vehicle based on the respective bounding box and object instance classification label for the first dynamic object.

11. A system comprising a processor device coupled to a memory, the memory storing executable instructions that when executed by the processor device configure the system to perform an object detection task comprising:

obtaining a semantic segmentation map representing a real-world space, the semantic segmentation map including an array of elements that each represent a respective location in the real-world space, the array of elements including elements that are each assigned a respective element classification label selected from a set of possible classification labels that correspond to different classifications of dynamic objects;

clustering groups of the elements based on the assigned respective element classification labels to identify at least a first cluster of elements that have each been assigned the same respective element classification label;

generating, based on a location of the first cluster within the semantic segmentation map, a plurality of anchors, each of the plurality of anchors defining a respective probable object location of a first dynamic object, wherein generating the plurality of anchors comprises:

computing an approximate location for the first dynamic object in the semantic segmentation map based on the locations of the elements of the first cluster;

generating a lower resolution map corresponding to the semantic segmentation map, and mapping the approximate location for the first dynamic object to a corresponding coarse element location in the lower resolution map;

generating a plurality of candidate anchors each indicating a different respective probable location of the first dynamic object relative to the coarse element location; and mapping at least some of the plurality of candidate anchors to respective element locations of a higher resolution map to provide the plurality of anchors; and generating, based on the semantic segmentation map and the at least one plurality of anchors, a respective bounding box and object instance classification label for the first dynamic object.

12. The system of claim 11 wherein computing the approximate location for the first dynamic object comprises determining a mean element location for the first cluster of elements based on the respective locations of the elements of the first cluster within the semantic segmentation map.

13. The system of claim 11, the object detection task comprising sampling the plurality of candidate anchors to select only a subset of the plurality of candidate anchors to include in the mapping to the respective element locations of the higher resolution map.

14. The system of claim 11 wherein clustering groups of the elements is performed to identify, in addition to the first cluster of elements, a plurality of further clusters that include elements that have each been assigned the same respective element classification label, the object detection task comprising, for each of the plurality of further clusters:

computing an approximate location in the semantic segmentation map for a respective dynamic object corresponding to the further cluster based on the location of the further cluster within the semantic segmentation map;

mapping the approximate location for the respective dynamic object to a corresponding coarse element location in the lower resolution map;

generating a respective plurality of candidate anchors each indicating a different respective probable location of the respective dynamic object; and mapping at least some of the respective plurality of candidate anchors to respective element locations in the higher resolution map to provide a respective plurality of anchors for the further cluster, each anchor of the respective plurality of anchors defining a respective probable object location of the respective dynamic object in the higher resolution map, the object detection task further comprising:
generating a respective bounding box and object instance classification label for each of the respective dynamic objects represented in the plurality of further clusters based on the plurality of anchors provided for each of the plurality of further clusters.

15. The system of claim 14, the object detection task comprising, prior to generating the respective bounding boxes and object instance classification labels for the first dynamic object and the respective dynamic objects represented in the plurality of further clusters, generating additional anchors according to a defined set of ad-hoc rules, each of the additional anchors defining a respective probable object location in the higher resolution map, wherein the generating the respective bounding boxes and object instance classification labels is also based on the additional anchors.

16. A non-transitory computer readable medium having instructions stored thereon, wherein the instructions, when executed by a processor device of a computing system, cause the computing system to perform a method comprising:
obtaining a semantic segmentation map representing a real-world space, the semantic segmentation map including an array of elements that each represent a respective location in the real-world space, the array of elements including elements that are each assigned a respective element classification label selected from a set of possible classification labels that correspond to different classifications of dynamic objects;
clustering groups of the elements based on the assigned respective element classification labels to identify at least a first cluster of elements that have each been assigned the same respective element classification label;
generating, based on a location of the first cluster within the semantic segmentation map, a plurality of anchors, each of the plurality of anchors defining a respective probable object location of a first dynamic object, wherein generating the plurality of anchors comprises:
computing an approximate location for the first dynamic object in the semantic segmentation map based on the locations of the elements of the first cluster;
generating a lower resolution map corresponding to the semantic segmentation map, and mapping the approximate location for the first dynamic object to a corresponding coarse element location in the lower resolution map;
generating a plurality of candidate anchors each indicating a different respective probable location of the first dynamic object relative to the coarse element location; and
mapping at least some of the plurality of candidate anchors to respective element locations of a higher resolution map to provide the plurality of anchors; and
generating, based on the semantic segmentation map and the plurality of anchors, a respective bounding box and object instance classification label for the first dynamic object.

* * * * *

UNITED STATES PATENT AND TRADEMARK OFFICE
CERTIFICATE OF CORRECTION

PATENT NO. : 12,327,414 B2
APPLICATION NO. : 17/827963
DATED : June 10, 2025
INVENTOR(S) : Ehsan Taghavi, Ryan Razani and Bingbing Liu Page 1 of 1

It is certified that error appears in the above-identified patent and that said Letters Patent is hereby corrected as shown below:

In the Claims

Claim 11, Column 18, Line 30: "the at least one plurality of anchors" should read -- the plurality of anchors --.

Signed and Sealed this
Eighth Day of July, 2025

Coke Morgan Stewart
*Acting Director of the United States Patent and Trademark Office*